United States Patent [19]
Sieber et al.

[11] Patent Number: 5,451,824
[45] Date of Patent: Sep. 19, 1995

[54] LINEAR ACTUATING DEVICE

[75] Inventors: Edmond Sieber, Donatyre; Claude Rudaz, Granges-Paccot, both of Switzerland

[73] Assignee: Saia AG, Switzerland

[21] Appl. No.: 236,552

[22] Filed: May 2, 1994

[30] Foreign Application Priority Data

May 3, 1993 [CH] Switzerland .................. 01351/93

[51] Int. Cl.[6] .................................................. H02K 7/06
[52] U.S. Cl. ............................................. 310/80; 310/20
[58] Field of Search ................. 310/12, 80, 68 R, 273, 310/20, 23, 14; 251/129.01, 129.11

[56] References Cited

U.S. PATENT DOCUMENTS

| | | | |
|---|---|---|---|
| 2,276,195 | 12/1939 | Holmes | 137/139 |
| 2,445,658 | 12/1943 | Boshofberger et al. | 318/366 |
| 4,412,517 | 11/1983 | Kobashi et al. | 123/339 |
| 4,607,180 | 8/1986 | Stoody | 310/80 |
| 4,700,750 | 10/1987 | Cook | 138/46 |
| 4,708,316 | 11/1987 | Cook | 251/39 |
| 4,751,411 | 6/1988 | Fukaya et al. | 310/49 R |
| 5,042,448 | 8/1991 | Cook et al. | 123/585 |
| 5,045,741 | 9/1991 | Dvorsky | 310/209 |
| 5,179,977 | 1/1993 | Iwata et al. | 137/625.5 |

FOREIGN PATENT DOCUMENTS

| | | |
|---|---|---|
| 0333539 | 2/1989 | European Pat. Off. |
| 2394682 | 6/1979 | France |

*Primary Examiner*—Thomas M. Dougherty
*Assistant Examiner*—D. R. Haszko
*Attorney, Agent, or Firm*—Ostrolenk, Faber, Gerb & Soffen

[57] ABSTRACT

A valve head is actuated by a resetting spring, on one hand, and on the other hand, by the rotor of a motor acting upon a screw and nut assembly. The rotor of the motor is axially coupled to a plunger of an electromagnet. Said valve head, the rotor of the motor, and said plunger of said electromagnet are thus jointly displaceable in the axial direction. In the resting position, or in the case of a power breakdown, said valve is closed by a spring, and said rotor as well as said plunger of said de-energized electromagnet are axially displaced. In the working position, said plunger is attracted and maintained in its working position by a pole piece of said electromagnet, and said rotor is also maintained in its working position in order to regulate the position of said valve head by means of said screw and nut assembly.

5 Claims, 1 Drawing Sheet

LINEAR ACTUATING DEVICE

BACKGROUND OF THE INVENTION

The present invention refers to a linear actuating device comprising an electric motor whose rotor acts upon a screw and nut assembly in order to displace the actuated element, as well as resetting means for resetting the actuated element to a resting or safe position, and an electromagnet maintaining the actuated element in its working position. Such an actuating device is known from FR-A-2,394,682. However, the electromagnet of this actuating device only serves to maintain the driven element in its working position, but no adjustment of said element between its working position and its resting position is provided.

SUMMARY OF THE INVENTION

It is the object of the present invention to provide an actuating device allowing an adjustment of said element between its resting position and its working position. Said actuating device is characterized in that said screw and nut assembly is coupled to said electromagnet and is capable of being axially displaced together with said electromagnet. The control of said magnet is extremely simple since it is always supplied except in the case of an unvoluntary interruption of the power supply.

BRIEF DESCRIPTION OF THE DRAWING

The invention will be explained in more detail by way of a nonlimitative embodiment, an axial cross-section of which is represented in the drawing.

DETAILED DESCRIPTION OF THE INVENTION

Figure 1:
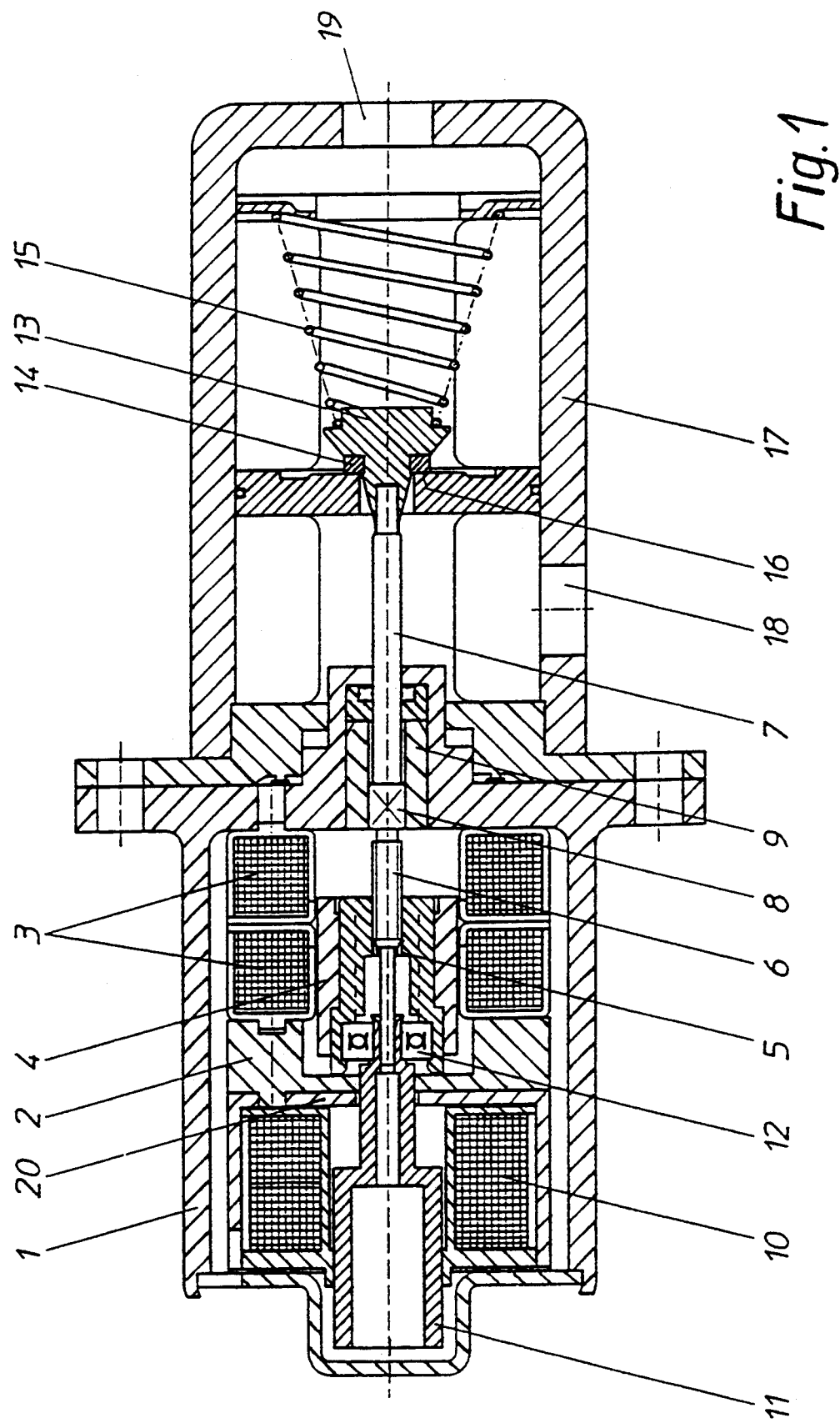

Sleeve-shaped housing 1 holds a support 2 which supports stator 3 of a step motor or reversible synchronous motor. A suitable supply of the two parts of stator 3 allows to drive permament-magnetic rotor 4 in one or the other direction, possibly at variable speeds. Said rotor 4 comprises a portion 5 having an inner thread and forming a screw and nut assembly together with a threaded portion 6 of actuating rod 7 which is axially displaceable but rotationally secured by means of a portion 8 having a square cross-section which is axially guided in a sleeve 9. Support 2 also supports the winding 10 of an electromagnet. Winding 10 acts upon a plunger or armature 11 which is connected to rotor 4 by means of a ball-bearing 12. Thus, plunger 11 and rotor 4 are axially coupled while said rotor 4 is free to rotate with respect to said plunger 11.

In the illustrated example, rod 7 of the actuating device acts upon a valve block 13 which carries a valve seal 14. In the represented position, a spring 15 presses seal 14 rearward (to the left with respect to FIG. 1) against a valve seat 16 which is mounted in valve body 17. The fluid whose flow rate is to be regulated by said valve circulates between an inlet 18 and an outlet 19.

In the represented position, which corresponds to a resting position, said valve is closed by the force of spring 15 with rod 7, rotor 4 and plunger 11 being moved to a resting or safety position in which rotor 4 is located partly outside stator 3 of said motor and plunger 11 is removed from a pole piece 20 of said electromagnet. Energization of the electromagnet winding 10 has no operational influence upon the element within housing 1 in their represented position of FIG. 1, as the force acting upon the plunger 11 is insufficient to overcome the force of spring 15. It is now assumed that the motor stator 3 is energized in order to rotate the rotor 4 in the direction of a closure of the valve. However, since the valve 13, 14, 16, is already closed and the valve head 13 cannot be moved further to the left of its position in the drawing, rotor 4 and plunger 11 coupled thereto are moved to the right. Said movement can be effected at a relatively high speed if the selected control circuit allows a regulation of the motor speed. In spite of the displaced position of rotor 4 partly outside of winding 3, the moment of the motor is sufficient to rotate the rotor and displace it to the right together with plunger 11. Said displacement by rotation of rotor 4 continues until plunger 11 is close enough, near the end of its stroke, to pole piece 20 to be suddenly attracted to the latter. The rotor 4 of the motor and plunger 11 are thus returned to their working positions from where the position of the valve can be regulated by a suitable rotation of rotor 4 and of its nut 5. In the case of an interruption of the power supply, the electromagnet 11, 20 is demagnetized, and plunger 11 with all elements coupled thereto are axially displaced to the left by spring 15 in order to immediately and completely close the valve. As soon as the power supply is restored, the electromagnet plunger 11 is first returned to its working position by means of the motor 3, 4, which will then effect the regulation of the valve 13, 14, 16 as described above.

The constructive details of the actuating device and its applications are not limited to the above-described example. The actuating device can act upon other elements. The resetting spring can be integrated in the actuating device itself, so that the latter can actuate any kind of element to be displaced. Instead of a resetting spring, gravity could be used in order to reset the elements to a resting position in the case of a power breakdown. Instead of an axially displaceable rotor, a non-displaceable rotor can drive a nut or a threaded sleeve which is axially displaceable with said electromagnet.

We claim:
1. A linear actuating device comprising:
an actuated element;
a resetting device for biasing and resetting the actuated element to a resting position by moving the actuated element axially rearward;
an electric motor including a stationary stator and a rotor;
a screw and nut assembly including first and second sections that are threadably engaged in a manner such that rotation of one of said sections about an axis is effective to obtain relative axial movement between said sections when the other of said sections is held against rotation about said axis;
said first section and said actuated element comprising a first unitary structure, said second section and said rotor comprising a second unitary structure;
said rotor, said assembly and said actuated element being axially displaceable forward and rearward relative to said stator;
an electromagnet for maintaining said rotor together with said screw and nut assembly in a working position axially forward of said resting position;
said electromagnet including an armature operatively connected with said rotor for axial displacement in unison therewith, and being biased axially rearward by said resetting device toward a resting position;

with said armature in its said resting position, excitation of said electromagnet producing an electromagnet force which acts upon said armature and is at a level below that required to move said armature forward of its said resting position;

upon rotation of said rotor, said armature being movable forward from its said resting position by said screw and nut assembly to an axial location where electromagnet force produced by excitation of said electromagnet continues moving said armature forward to a holding position where said armature maintains said rotor in its said working position.

2. The actuating device of claim 1 wherein a substantial portion of said rotor is disposed outside of said stator and rearward thereof when said actuated element is in its said resting position.

3. The actuating device of claim 1, wherein said rotor in its said working position is located approximately in a symmetrical position with respect to the stator of said motor in order to allow operation of said rotor in both rotational directions.

4. The actuating device of claim 1, comprising a control circuit capable of automatically energizing said motor for operation in that direction which displaces the armature of said electromagnet toward its said working position by means of said screw and nut assembly.

5. The actuating device of claim 2, wherein said rotor in said working position is located approximately in a symmetrical position with respect to the stator of said motor in order to allow operation of said rotor in both rotational directions.

* * * * *